May 29, 1928.  
W. C. STEVENS  
TIRE BUILDING MACHINE  
Filed Aug. 4, 1925

INVENTOR.
WILLIAM C. STEVENS
BY G. L. Ely
ATTORNEY.

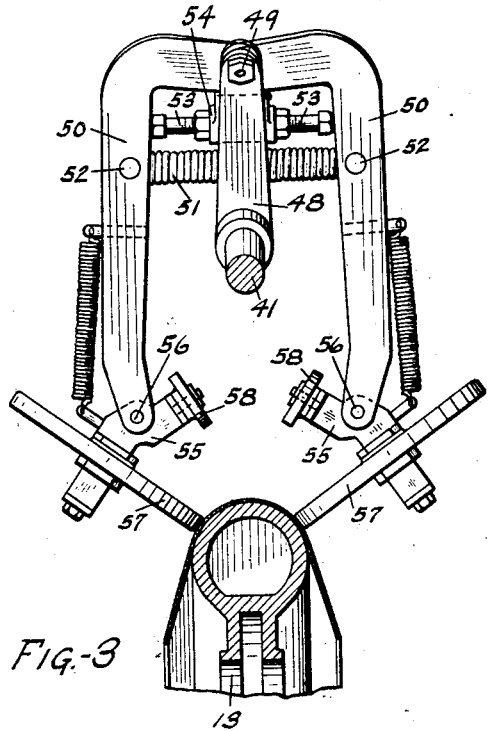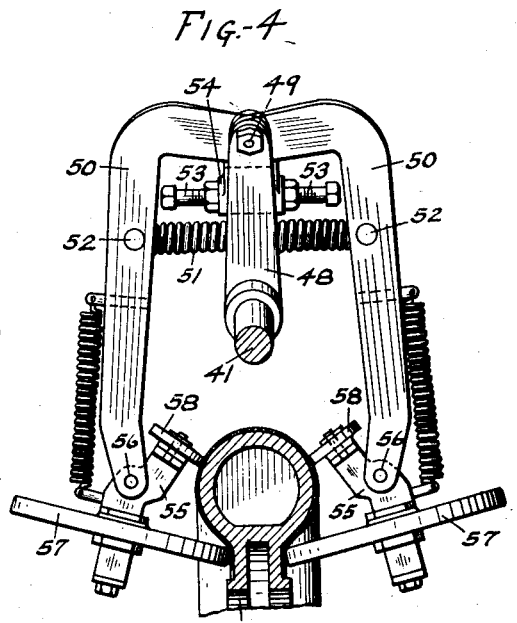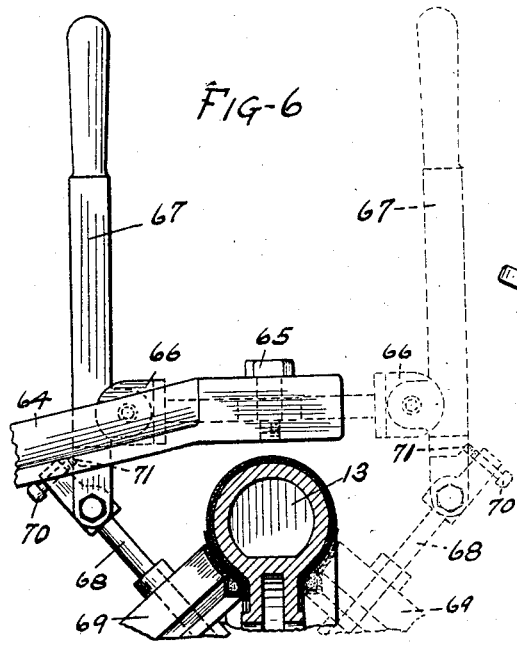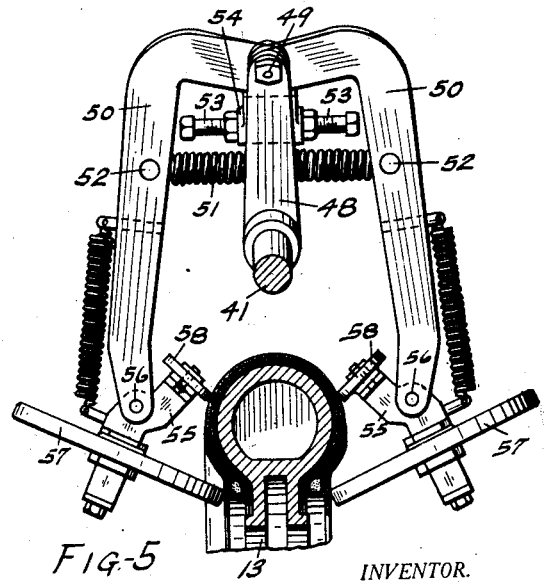

Patented May 29, 1928.

1,671,940

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

TIRE-BUILDING MACHINE.

Application filed August 4, 1925. Serial No. 48,174.

This invention relates to tire building machines.

One object of the invention is to provide an improved stitcher device for machines for building pneumatic tire casings, and particularly one which will be not only simple, inexpensive and easy to operate, but also will perform the stitching operation as effectively as the more complicated devices heretofore employed.

The foregoing and other objects are obtained in the machine illustrated in the accompanying drawings and described in detail below. It is to be understood that the invention is not limited to the specific form thereof shown and described.

Of the accompanying drawings:

Figures 3 to 5 are front elevations of the stitcher device in various working positions with respect to a tire building core; and Figure 6 is an end elevation illustrating the bead setting device in one working position thereof, the other working position thereof being indicated by dotted lines.

Figure 1:
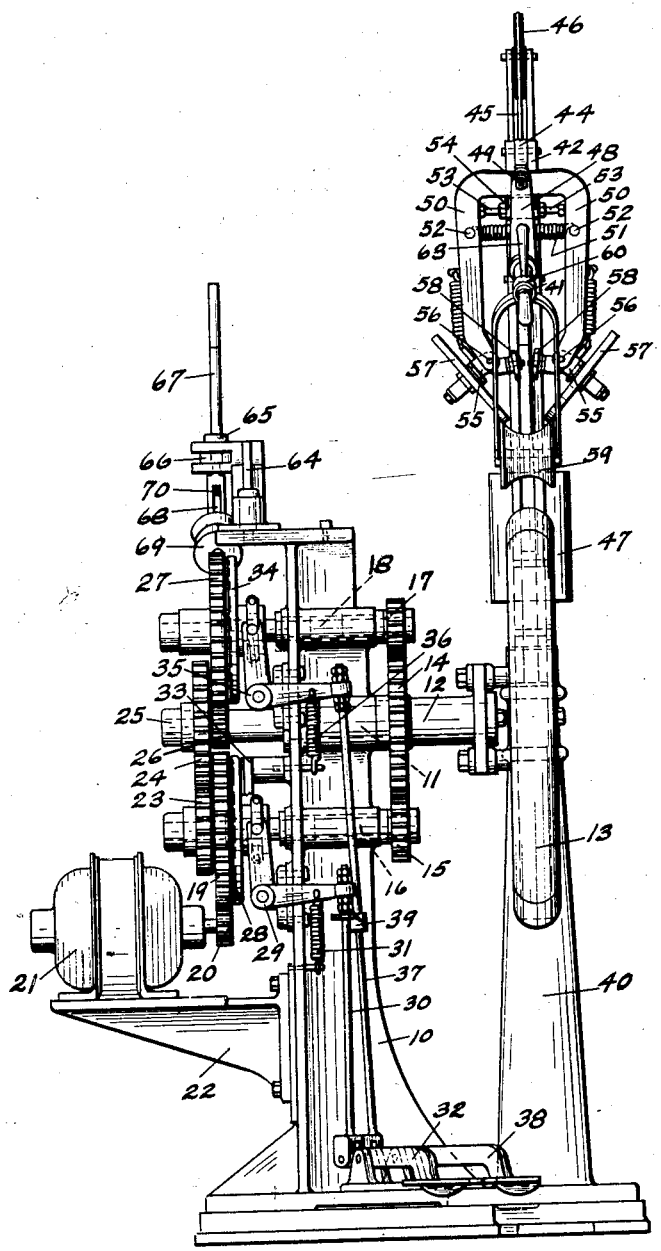
Figure 1 is a front elevation of a machine embodying the invention.

Referring to the drawings, 10 is a suitable standard having secured therein a spindle 11 on which is journaled a sleeve 12 having fixed thereon any suitable form of tire building core such as the collapsible core indicated at 13. Sleeve 12 has fixed thereon a gear 14 permanently meshed with a gear 15 on a shaft 16 and a gear 17 on a shaft 18, shafts 16 and 18 each being journaled on standard 10.

Shaft 16 has journaled thereon a gear 19 meshed with a pinion 20 on the rotor shaft of a motor 21 mounted on a bracket 22 on standard 10, and to which gear 19 is connected a gear 23, meshed with a gear 24 journaled on a pin 25 on standard 10 and connected to a gear 26 which is meshed with a gear 27 journaled on shaft 18. For clutching gear 19 to shaft 16 to drive the latter, a friction clutch 28 is keyed or splined thereon, so as to be shiftable into engagement with gear 19, clutch 28 being shiftable by means of a bell-crank lever 29 operable by a rod 30 against the action of a spring 31 by means of a foot-pedal 32. A fixed brake 33 is arranged to be engaged by clutch disc 28 when the clutch is thrown out so as quickly to stop rotation of core 10. Drive of core 13 through shaft 16 provides for comparatively rapid rotation thereof for the stitching operations.

On shaft 18 is shiftably keyed or splined a friction clutch 34 operable by a bell crank lever 35 which is operable against the action of a spring 36 by a rod 37 connected thereto and to a foot pedal 38. Operation of core 13 through shaft 18 provides for slow rotation thereof such as required for applying tire building material or beads on the core. In order to disengage clutch disc 28 from brake 33, when clutch 34 is engaged, a fork 39 is secured on rod 37 and arranged to embrace rod 30 at such a point thereon that when pedal 38 is depressed, fork 39 will engage and elevate bell-crank lever 29 just sufficiently to disengage disc 28 from brake 33 without, however, forcing it into engagement with gear 19.

Arranged adjacent standard 10 is a second standard 40 on which is mounted the stitching device of the invention. It has been found desirable, from the standpoint of ease of operation, conservation of floor space and provision of inexpensive machinery, to provide a stitching device operable from above into engagement with the core. Heretofore an ordinary pivoted lever has been arranged to carry the stitching device. According to the present invention, however, a lever 41 is provided which is secured onto a member 42, whereby the stitcher will travel substantially along a straight line instead of along an arc. This straight line movement has been found to be practically a necessary provision for operating the stitchers to be described below.

In order to obtain the straight-line movement above described, member 42 is carried by a pair of substantially parallel links 43, and 44 to which it is hingedly connected and which in turn are hingedly mounted on standard 40. So as normally to hold the stitcher device elevated above core 13, a cable 45 is connected to link 44 and is passed over a sheave 46 journaled on the top of standard 40 and has suspended thereon a counter-weight 47.

The stitcher device carried by lever 41 comprises a pair of bracket arms 48, 48 supporting a pivot pin 49 on which are pivoted arms 50, 50 yieldingly urged toward each other by a spring 51 extending between pins 52, 52 thereon, movement of arms 50 toward each other being limited by adjustable screws 53, 53 threaded onto a lug 54 on one arm 48. Arms 50 have on the free ends thereof brackets 55, 55 pivoted at 56, 56 and having journaled thereon stitcher rollers 57, 57 and stitcher operating rollers 58, 58 arranged to engage the core and swing brackets 55 so as to change the annular positions of rollers 57 and to urge said rollers into engagement with the inner portions of the core as illustrated in Figures 4 and 5. In order that this stitching device may function properly, the movement thereof must be substantially in a straight line radially of the core, which result is obtained by the operating device already described.

Lever 41 also carries a tread roller 59 carried on a bracket 60 keyed so as to be slidable on lever 41 between an outer stop pin 61 and an inner stop pin 62, which latter positions the roller 59 for operation onto core 13. Bracket 60 is shiftable by means of a handle 63.

The bead placing device comprises an arm 64 swiveled on top of standard 10 and having swiveled in its free end on pin 65 a link 66 on which is pivoted at 67ª for movement in vertical planes a lever 67 which has connected to its lower end a second lever 68 carrying a bead-placing roller 69 of a profile adapted to fit about a tire bead as illustrated in Figure 6, lever 68 being angularly adjustable to position roller 69 at an angle relative to lever 67 such that it will properly set the bead in place, by means of a screw 70 threaded through lever 68 into engagement with a stop member 71 formed on lever 67.

In operation of the machine, motor 21 being continuously driven, pedal 38 is depressed, whereby core 13 is slowly driven, the first ply of stock being applied onto the core in any known way. Pedal 38 is then released and pedal 32 depressed to rapidly rotate the core 13. Lever 41 is then drawn downwardly, operating stitchers 57 about the core 13 to stitch the first ply into place as illustrated in Figures 3 and 4. If a four-ply tire is being made, another ply is formed on the core as described above.

Figure 2:
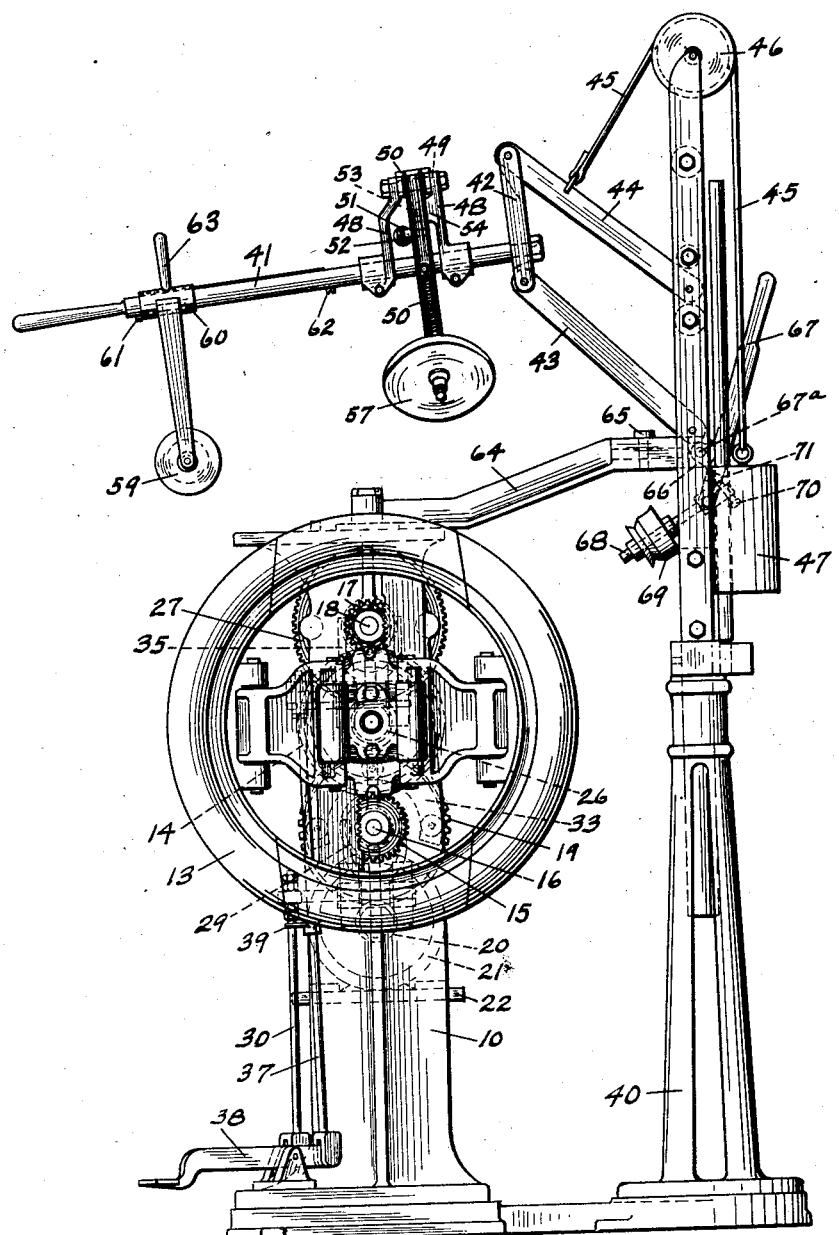
Figure 2 is a side elevation thereof.

After the two inner plies are stitched into place, arm 64 is swung from the position shown in Figures 1 and 2 to a position such that its free end is over core 13 as illustrated in Figure 6, with levers 67 and 68 first on the outer side of the core as shown in the full line position. An annular bead is set on roller 69 and lever 67 is operated so as to urge it against the core, the latter being rotated, whereby roller 69 progressively rolls the bead into place about the tire. Lever 67 is then swung (to the right in Figure 6) so as to withdraw roller 69 from the core, arm 64 being swung away from the core and at the same time the unit comprising levers 67 and 68 is swung about pin 65 so as to carry it onto the inner side of the core, arm 64 being again swung over the core to position the bead-placing unit as shown in the dotted lines in Figure 6. The inner bead is then affixed in a similar manner to the outer bead. The bead-placing device is then swung out of the way, the remaining plies being stitched onto the core and about the beads (Figure 5) to complete the carcass in the usual manner. The application of a combined tread, breaker, and cushion strip to the tire is now effected in any known way and this strip is rolled onto the carcass by means of roller 59 which is slid on lever 41 into engagement with pin 62, lever 41 being then depressed to force roller 59 against core 13.

It will appear from the foregoing that applicant has provided a simple, inexpensive stitching device adapted effectively to perform the stitching operation.

Modifications of the invention may be resorted to without departing from the spirit thereof or the scope of the appended claims.

What is claimed is:

1. Apparatus of the class described, comprising a rotatable core, and a stitcher device movable toward and from said core, said device including a lever, stitchers on said lever, a member to which said lever is connected, a support, a pair of substantially parallel links hingedly connected to said member and said support, and means normally urging said lever away from said core.

2. Apparatus of the class described, comprising a rotatable core, and a stitcher device movable toward and from said core, including a lever, stitchers mounted thereon, a support for the device, and pivoted links so connecting the lever to said support that said stitchers may be moved toward said core by said lever substantially in a straight line.

3. Apparatus of the class described, comprising a rotatable core, and a stitcher device movable toward and from said core, said device comprising a support, a lever connected to the support, and stitchers carried by said lever, the connection between said lever and said support being hinged to permit movement of said stitchers substantially along a straight line.

4. Apparatus of the class described, comprising a rotatable core and a stitcher device including a pair of pivoted brackets bodily movable toward and from said core, stitchers on said brackets, core-engaging rollers on said brackets for operating the stitchers, and an overhead hand-operated lever for moving said stitchers toward said core along substantially a straight line.

WILLIAM C. STEVENS.